(12) United States Patent
Smyth

(10) Patent No.: US 6,678,246 B1
(45) Date of Patent: Jan. 13, 2004

(54) PROCESSING DATA PACKETS

(75) Inventor: Joseph Smyth, Galway (IE)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/349,348

(22) Filed: Jul. 7, 1999

(51) Int. Cl.[7] ................................................ H04J 12/26
(52) U.S. Cl. ........................ 370/230; 370/389; 370/400
(58) Field of Search ................................ 370/230, 235, 370/252, 352, 389, 392, 394, 400, 401, 410, 426; 712/28, 34

(56) References Cited

U.S. PATENT DOCUMENTS

| 5,535,200 A | * | 7/1996 | Gardner ...................... 370/410 |
| 6,009,471 A | * | 12/1999 | Harumoto et al. .......... 709/231 |
| 6,195,739 B1 | * | 2/2001 | Wright et al. ................. 712/19 |
| 6,542,504 B1 | * | 4/2003 | Mahler et al. ............... 370/392 |

FOREIGN PATENT DOCUMENTS

WO WO 99 04343 A 1/1999

OTHER PUBLICATIONS

IPER for PCT/GB00/02475.
TCP/IP Illustrated, vol. 1, pp 150–151, 225–227, index. 1994.
XP000728935 —Degermark M et al: "Low–Loss TCP/IP Header Compression for Wireless Networks" Wireless Networks, US, ACM, vol. 3, No. 5 –1 Oct. 1997.
Network Working Group, Compressing IP/UDP/RTP Headers for Low–Speed Serial Links–RFC 2508, Feb. 99, IETF.*

* cited by examiner

Primary Examiner—Ajit Patel
Assistant Examiner—William Schultz
(74) Attorney, Agent, or Firm—Barnes & Thornburg

(57) ABSTRACT

A received data stream is formed into a stream of packets, each packet comprising a payload section of data and an overhead section. In forming the packets, a template overhead section is created for use by the stream of packets and this template is applied to the data to form the packets. This avoids the need to individually pass packets through a routing stack, thus reducing the processing demands on the processor which constructs the data packets and reducing the transmission delay experienced by data. The template overhead section can be formed by sending a packet through a routing stack. Another aspect describes apparatus for processing packets where a first processor processes signalling packets and a second processor processes real-time data packets. The first processor can be, used to create the template overhead section before passing the template information to the second processor where it can be used in forming the real-time data packets.

21 Claims, 8 Drawing Sheets

PROCESSING DATA PACKETS

FIELD OF THE INVENTION

This invention relates to a method and apparatus for processing data packets. It can be used in processing Internet Protocol (IP) packets.

BACKGROUND OF THE INVENTION

Packet and cell-based transport protocols are gaining acceptance for their ability to carry a wide range of traffic types such as voice, data and video. Internet protocol (IP) is widely gaining acceptance in the industry as a networking protocol that provides communication across interconnected networks and between computers with diverse hardware architectures and operating systems. The International Telecommunications Union (ITU) H.323 and the Internet Engineering Taskforce's Session Initiation Protocol (SIP) protocol suites are both being developed as standards for IP and internet telephony. FIG. 1 shows a typical way in which voice data is processed for transport over an IP network. Firstly, voice data is received (2) and is often compressed (4) and forms the payload of a data packet. The data packet is routed through an IP stack (6) which adds routing and other overhead information to the packet. Finally, the assembled data packet is transmitted over the data network (8). As shown in FIG. 2, this results in a stream of packets 74–77, each packet comprising an overhead or header section 70 and a payload section 72. Each data packet is processed in this same manner, i.e. the overhead section 70 of each of the packets 74–77 is generated by routing the packet through the IP stack. The step of routing the data packet through the IP stack is often performed by software and places a high demand on the system processor. The demands on the processor are further compounded by the fact that the data is real time voice data which requires real time processing to avoid distracting delays to the voice signal.

SUMMARY OF THE INVENTION

The present invention seeks to provide a more efficient way of processing data packets.

A first aspect of the invention provides a method of processing a received data stream which is intended for transmission in packet form over a data network, the method comprising:

forming the data into a stream of packets, each packet comprising a payload section of data and an overhead section;

and wherein the step of forming the packets creates a template overhead section for use by the stream of packets and applies the template to the data to form the packets.

Generating a template overhead, or header, section for use by the stream of packets has significant advantages. The overhead data need only be generated once rather than for every packet in the stream. This significantly reduces the processing demands on the processor which constructs the data packets. This can allow a cheaper microprocessor to be used or the same microprocessor can support more channels of traffic processing than was previously possible. It can also reduce the transmission delay experienced by data, which improves the quality of the traffic carried by the data.

Preferably the step of creating the template creates a template which includes routing information for the packet. The template overhead section can be formed by sending a packet through a routing stack. Subsequent data to which the template is applied is not passed through the routing stack, thereby saving considerable processing resources.

Preferably the method further comprises:

generating a packet which can subsequently be identified as a template packet;

and wherein the template overhead section is formed by:

sending this template packet through the routing stack;

subsequently identifying the packet as a template packet; and, using the routing information that has been applied to the template packet by the routing stack to form the template overhead section.

A template structure can be created in memory and the packet which is passed through the routing stack can include a pointer to this template structure. This pointer can be held in the payload of the packet which is passed through the routing stack and the structure can include an identifier that the packet is a template packet.

Advantageously the routing information is copied from the template packet to the template structure. This subsequent identification of the packet as a template packet, and copying of information to the structure can be performed at the data link layer. This method is totally independent of the internal workings of the routing stack, since the stack operates on a payload of data in the normal fashion to generate the usual routing and other overhead information. It is the subsequent inspection of the packet by the data link layer which reveals that the packet is a template packet and which causes the template structure to be filled with the overhead information.

If required, a new template overhead section can be created periodically during the duration of the data stream.

The templating method is only suitable for selected packet types. Therefore it is preferable to include the further step of determining the type of packet and only performing the steps of generating a template and applying the template on selected packet types. The templating method is particularly suitable for Realtime Transport Protocol (RTP) and User Datagram Protocol (UDP) packet types.

Further advantages can be gained by creating the template packet using a first processor and applying the template to the data using a second processor. Advantageously, the second processor is a processor that has lower functionality than the first, and can be a co-processor of the first processor; a reduced instruction set (RISC) processor, or a field programmable gate array (FPGA).

Another aspect of the invention provides apparatus for processing a received data stream which is intended for transmission in packet form over a data network, the apparatus comprising:

a processor for forming the received data into a stream of packets, each packet comprising a payload section of data and an overhead section;

and wherein the processor is arranged to form the packets by creating a template overhead section for use by the stream of packets and applying the template to the data to form the packets.

The apparatus may be embodied entirely in hardware, or a combination of software and hardware.

The method may be implemented as software code which controls a processor. Accordingly, a further aspect of the invention provides software code for performing the method. The code may be stored on a machine-readable medium such as a diskette, optical disc or memory device.

A further aspect of the invention provides a method of processing data packets, the packets being of two types:

signalling packets and real-time packets carrying realtime data, the method comprising the steps of:

processing the signalling packets by a first processor; and, processing the real-time data packets by a second processor.

Advantageously the second processor is a processor that has lower functionality than the first. This considerably relieves the processing demand on the first processor and can result in an arrangement which is cheaper than one that uses a set of full-functionality processors. Advantageously the second processor is one of: a co-processor of the first processor; a reduced instruction set (RISC) processor, and a field programmable gate array (FPGA).

When transmitting data packets, further advantages can be gained by generating, using the first processor, a template overhead section for use by a stream of real-time data packets and applying, using the second processor, the template to the real-time data packets.

Preferred features may be combined as appropriate and may be combined with any of the aspects of the invention, as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Figure 3:
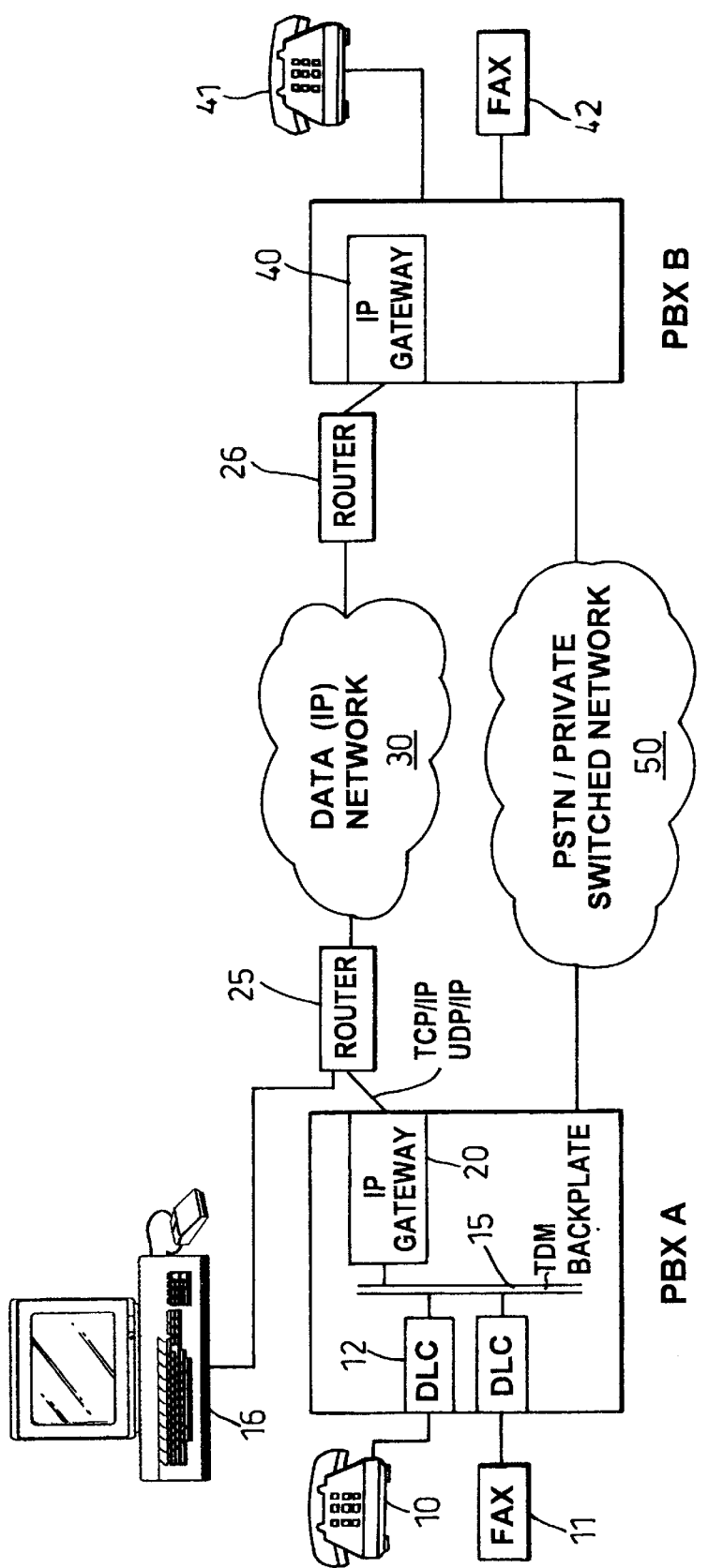
FIG. 3 shows an example system for carrying voice traffic over a data network.

FIG. 3 shows a typical system which allows a telephony call to be made via a data network. Terminals 10, 11 are connected to respective digital line cards (DLC) 12 in a private branch exchange PBX A. Voice, facsimile and other information together with signalling information is switched, via a time division multiplexed (TDM) backplane 15 to an IP gateway card 20 which interfaces with a data network 30. Gateway card 20 performs conversion of traffic between the format used by the PBX and the format necessary for transport over the data network 30. The gateway function also handles translation between a dialed number and an internet protocol address. The traffic is typically carried over the data network according to TCP/IP or UDP/IP formats; signaling typically being carried by TCP packets and speech data by a stream of real time transport protocol (RTP) user datagram protocol (UDP) packets. The speech or other voice band information is packaged into data packets which each have a header that carries information to allow the packet to be routed across the data network 30. The data network includes routers 25, 26 which perform routing of the traffic across the data network 30. The above apparatus is known in the art. The data network 30 can be a private IP-based data network or intranet or it can be the public internet. Where a user is making a call from a computer terminal 16 which is directly connected to the data network 30, the functions of the IP gateway card (assembling voice data into packets) are performed by software at the terminal 16 itself.

Figure 4:
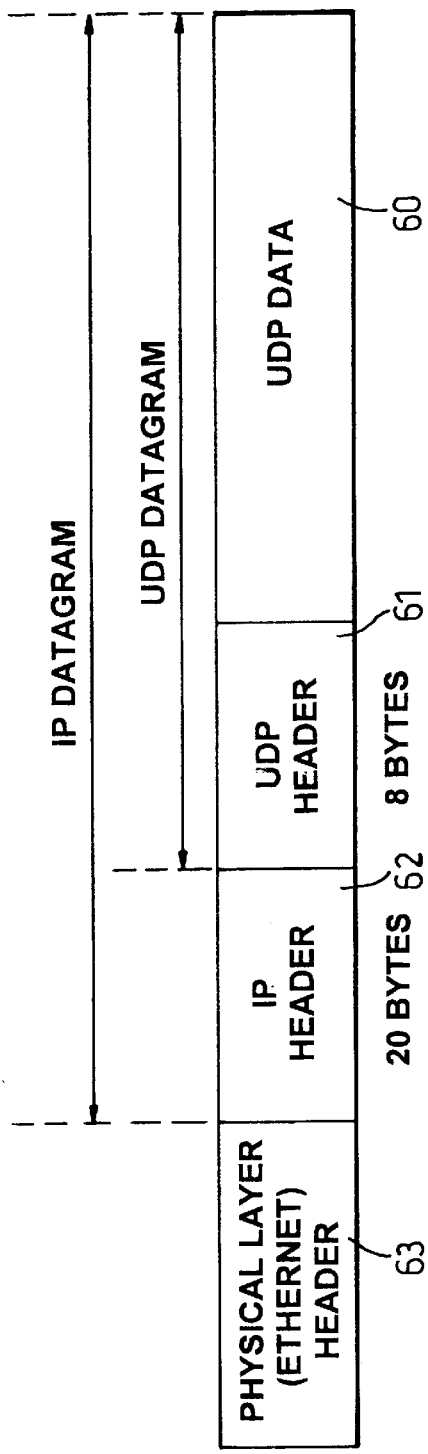
FIG. 4 shows the format of an IP packet.
Figure 5:
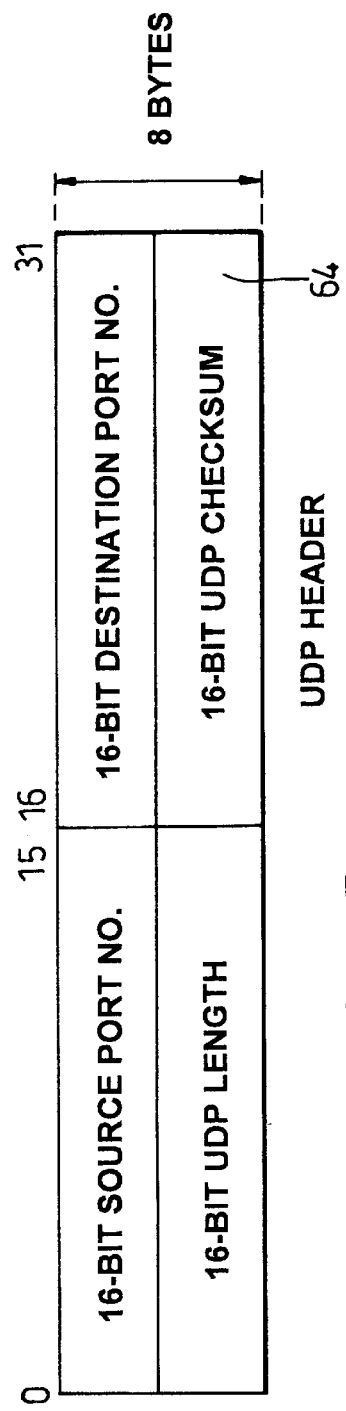
FIG. 5 shows the format of a UDP header.
Figure 6:
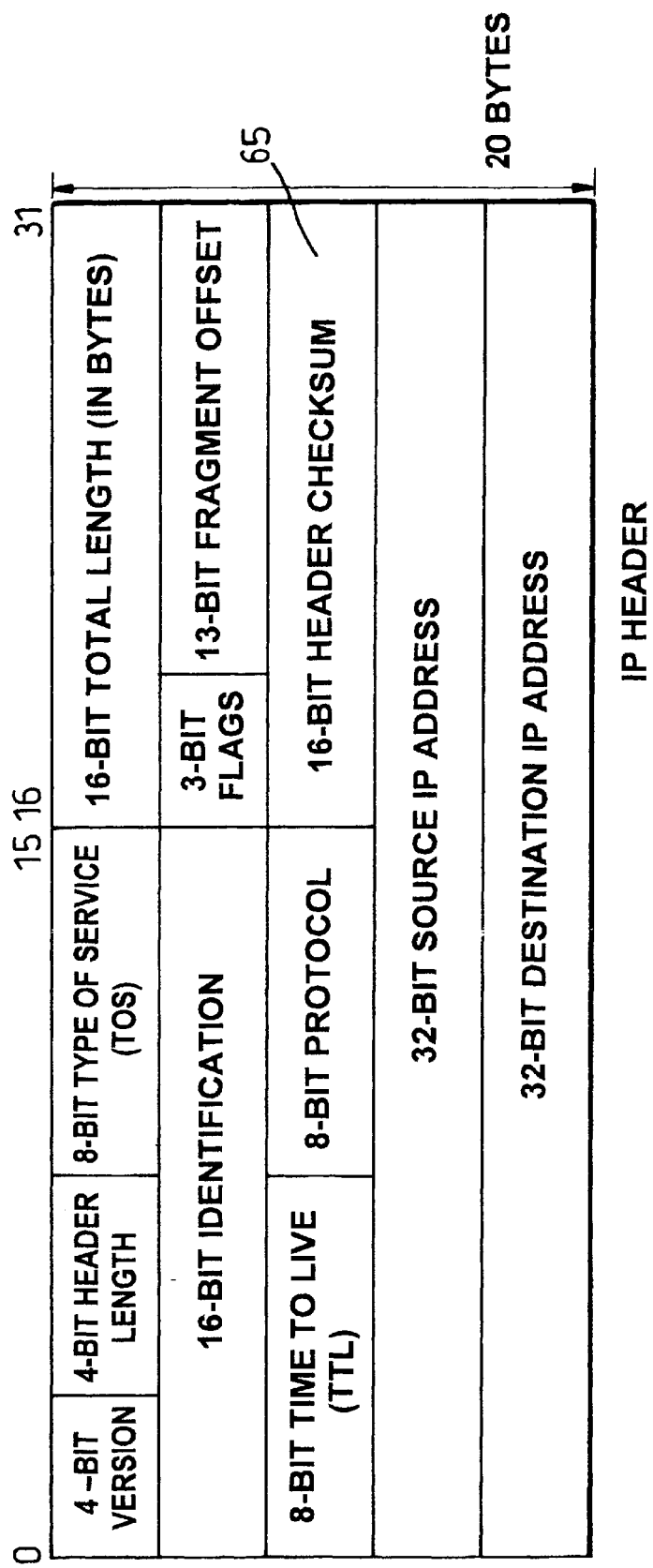
FIG. 6 shows the format of an IP header.

FIG. 4 shows the format of an IP packet or datagram which carries UDP data. This comprises a payload of UDP data 60, a UDP header (8 bytes) 61 and an IP header (20 bytes) 62 and a physical or data link layer header 63. The physical layer is often Ethernet. The length of the payload 60 can vary. FIG. 5 shows the format of the 8 byte UDP header 61 and FIG. 6 shows the format of the 20 byte IP header 62. The 16-bit UDP checksum 64 of the UDP header is calculated according to data present in the UDP Data 60, UDP header 61 and a portion of the IP header 62.

Figure 7:
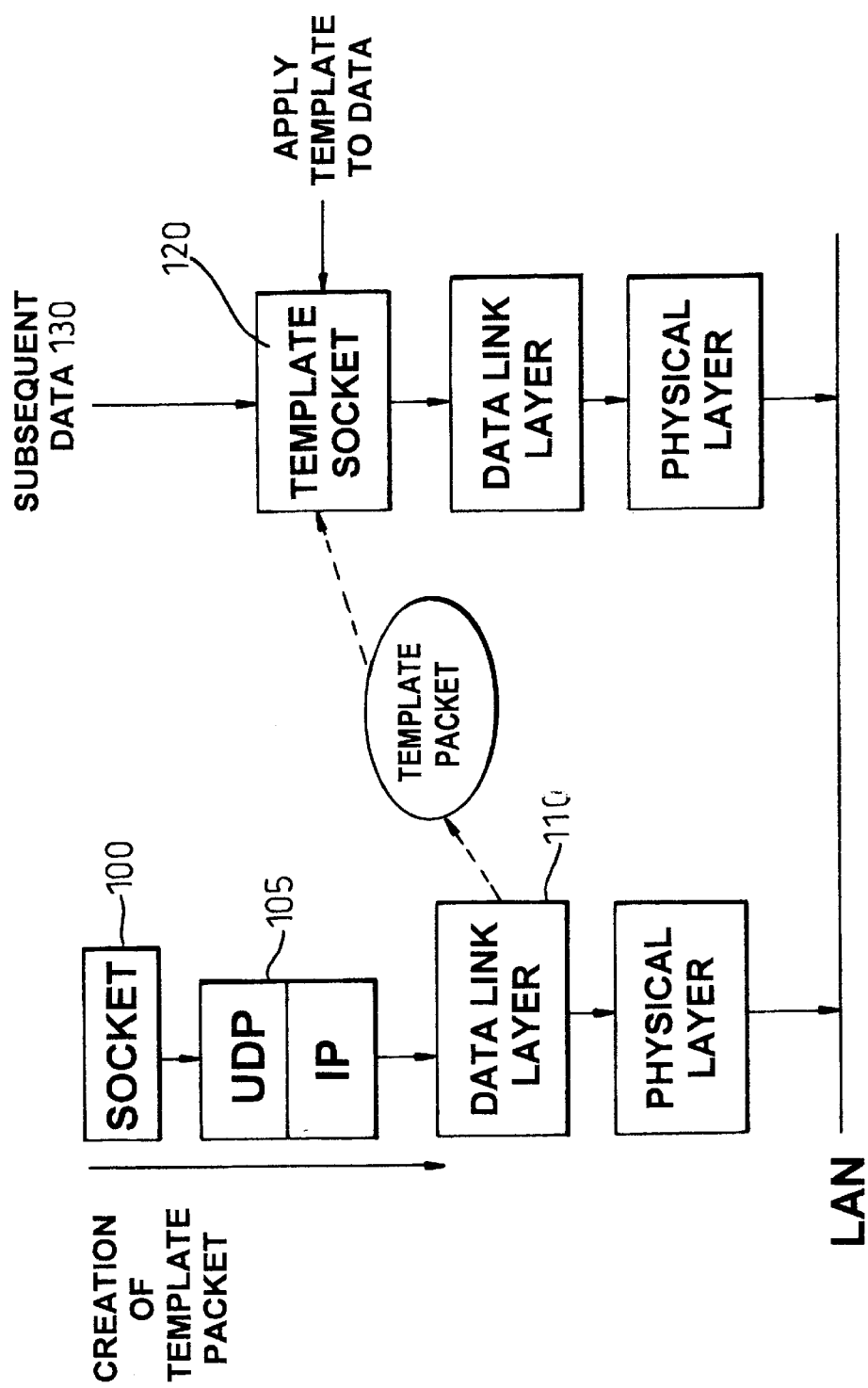
FIG. 7 shows the process of creating a template packet.

FIG. 7 shows a method in which data packets can be processed for transmission over a data network. It is illustrated with reference to UDP/IP packets, which are used to carry RTP voice data packets of the type used in Voice over IP applications. However, it will be appreciated that the technique can be applied more widely to any type of streamed data packets where the overhead information associated with each packet in the stream remains the same. TCP packets cannot be processed in this manner as they individually require acknowledgement at the IP layer.

Firstly, a UDP socket 100 is established at the source for sending a data stream from the source to a destination across the data network. The socket is usually established as a result of TCP/IP call setup signalling. A socket is a widely used programming interface for network interfaces in most modern operating systems.

A special template packet is routed through the usual UDP/IP routing stack 105. The payload of the template packet includes a pointer to, i.e. memory address of, a unique template structure stored in memory. This pointer allows the packet to be identified by the Data Link Layer as a template packet.

A preferred form of template structure contains:
1. Unique Identifier—used by the Data Link Layer to quickly determine if this is a template packet.
2. Semaphore—a flag used by the Data Link Layer to indicate to the sender of the template structure that the template is ready for use.
3. Driver Send Function—function specific to the interface through which the packets must be sent to allow direct transmission of subsequent packets, which are not routed through the UDP/IP stack. This is filled in by the Data Link Layer along with the packet template.
4. Driver Send Parameter—parameter that allows identification of an interface to send the packet stream through; used in conjunction with the Driver Send Function. This is required in a system with multiple network interfaces. This is filled in by the Data Link Layer along with the packet template.
5. Template data—the actual data of the created template.
6. Template length—the length of Template data area.

It is important that the Data Link Layer can quickly discern a non-template packet from a template packet so as not to adversely effect normal packet throughput. The device driver (Data Link layer 110) detects the template packet and passes the routed template packet back to the sender. The Data Link layer then copies the header information from the routed packet into the special template structure in memory. Subsequent data 130 is sent via the template socket 120, which uses the information in the template structure, which has just been filled in by the Data Link Layer, to send packets directly to the Data Link Layer.

The IP protocol includes an IP header checksum (65, FIG. 6) which covers the IP header only. The value of the checksum depends, inter alia, on the length of the payload. If the data packets are of the same length then the IP header checksum remains the same for all packets and can be included as part of the template information. This is done by sending a template packet padded to the length which the UDP stream packets will be. If the packets are of differing length, the IP header checksum must be recalculated for each of the packets before they are sent to the data link layer.

Figure 1:
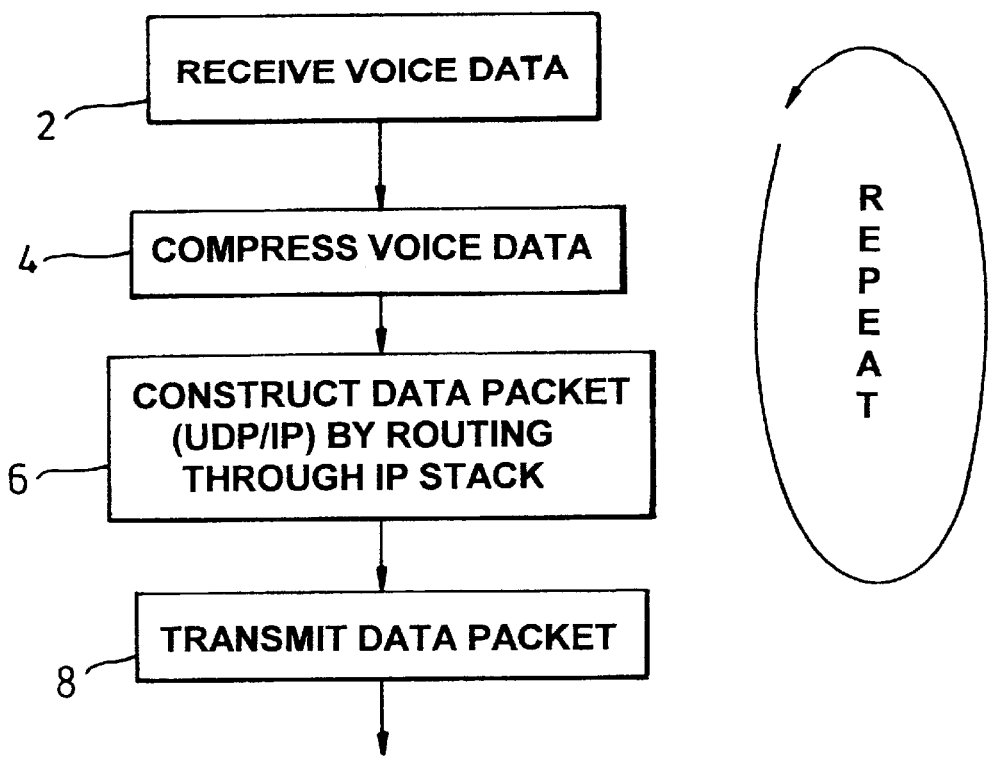
FIG. 1 shows a known method for processing voice data for transport over an IP network.
Figure 2:
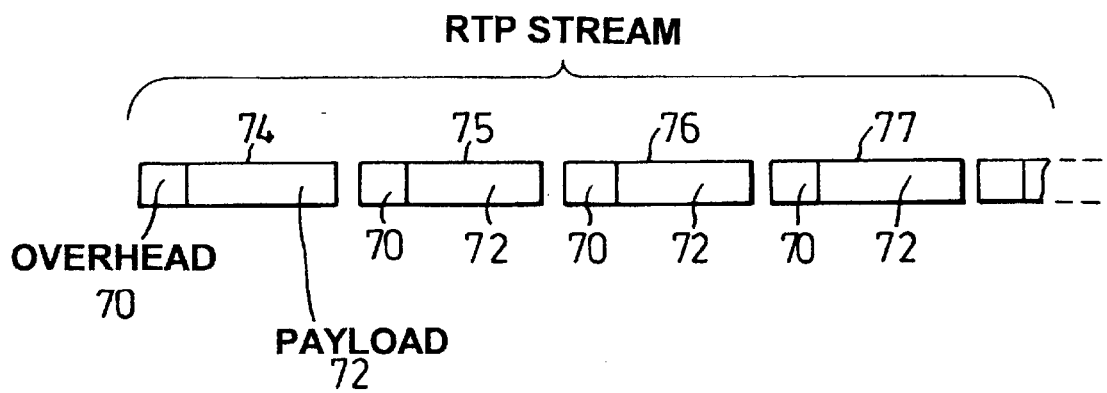
FIG. 2 shows a stream of packets, resulting from the method of FIG. 1.

The packets are sent directly to the device driver (data link layer) for transmission over the data network, bypassing the UDP/IP stack 105. Only the UDP checksum must be recalculated and, as described above, the IP checksum if the length varies from packet to packet. Thus, the subsequent data 130 to which the template is applied can be processed more quickly, without requiring the processor to perform the UDP/IP routing for every packet. Referring again to FIG. 2, the overhead section 70 of packet 74 can be generated by routing the template packet through the IP stack and the overhead sections 70 of packets 75–77 can be generated by applying the template, without routing each of packets 75–77 through the IP stack.

All subsequent packets are processed in this way, bypassing the UDP/IP stack 105. A new template is generated for each new UDP stream, such as at the start of a new call in a Voice over IP scenario. It is very unlikely that the routing information in the template will need to be changed, since the routing of a packet stream tends to be static. However, in a network where routes do change more frequently, it is possible to adapt the technique such that a new template packet is generated every N packets to cope with a route change. The value of N is chosen to be as large as possible for the specific network. In most applications it is rare for the routing to be changed, and the template information would only need to change if the first router 25 on the route across the data network is changed.

The following is a pseudo code description of the process of creating a template in an UDP/IP environment. There are two parts: the Socket side and the Data Link Layer side.

Socket Side:
1. Create the Socket as normal for transmitting data to destination.
2. Allocate memory space for the template structure described above and initialize the unique identifier.
3. Create the semaphore which will indicate when the template has been created by the Link Layer and fill the value into the template structure.
4. Call the write function for the socket with the data being the pointer to the template structure. If the data stream for which you are creating the template for is of fixed length, also write the socket with the enough pad data to make the socket write the correct length, e.g. if every packet is X bytes long, write the socket with the pointer value and (X—size of pointer) pad bytes. The value of the pad bytes is not important. This only works if the packet length is less than the UDP maximum packet size.
5. Wait on the semaphore.
6. When the Link Layer gives the semaphore, the remaining fields of the template structure have been filled in by the Link Layer and the template is now ready for use.
7. All further data packets are sent directly to the Link Layer (110) by using the driver send function from the template structure.

Link Layer side:
1. Check the packet to see if it is a template packet by de-referencing the pointer value returned by assuming the first (size of pointer) bytes is a template structure pointer. Range check the pointer to make sure it is in a valid memory range before de-referencing. Check the Unique Identifier to determine is it a valid template packet.
2. If it is not a template packet, transmit as normal.
3. If it is a template packet, fill in the template structure with the packet header contents and length. Fill in the driver send function and parameter fields with the relevant details for this device driver (link layer).
4. Give the semaphore to tell the socket layer that the template structure is ready for use.
5. Release any memory associated with the data packet, all relevant data is now stored in the template structure.

Figure 8:
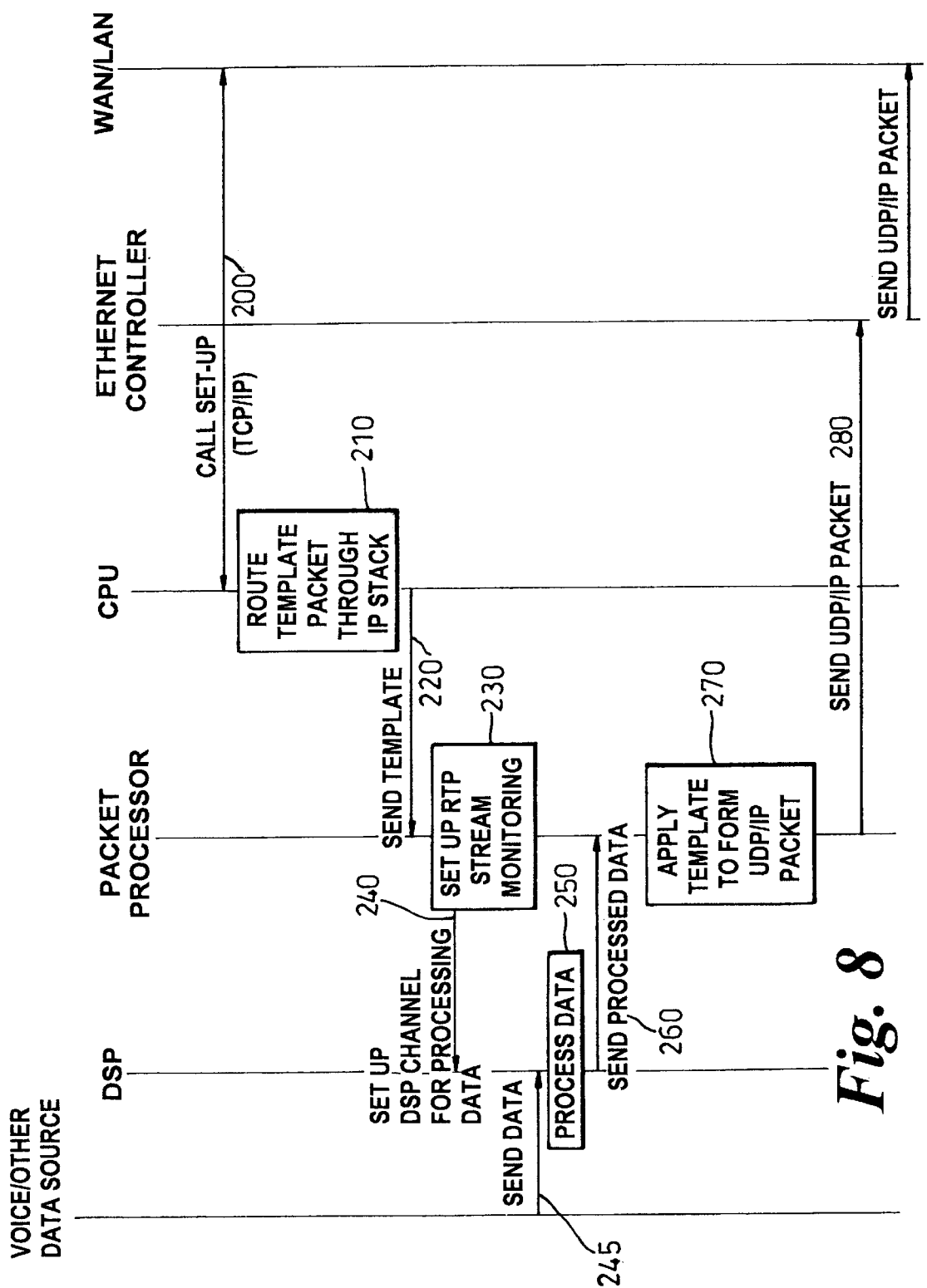
FIG. 8 shows a method in which data packets can be processed for transmission over a data network.
Figure 9:
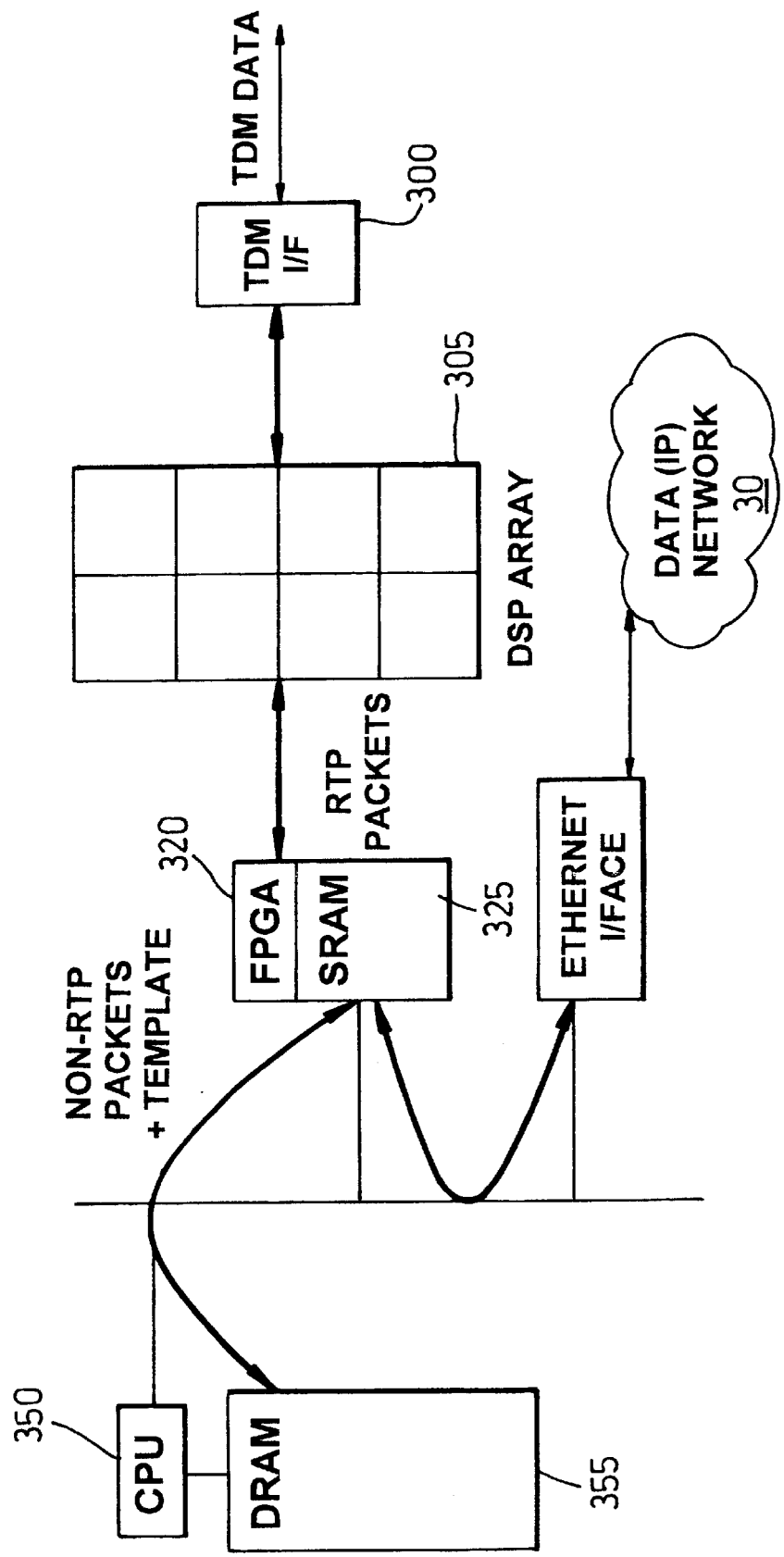
FIG. 9 shows apparatus for processing packets.
Figure 10:
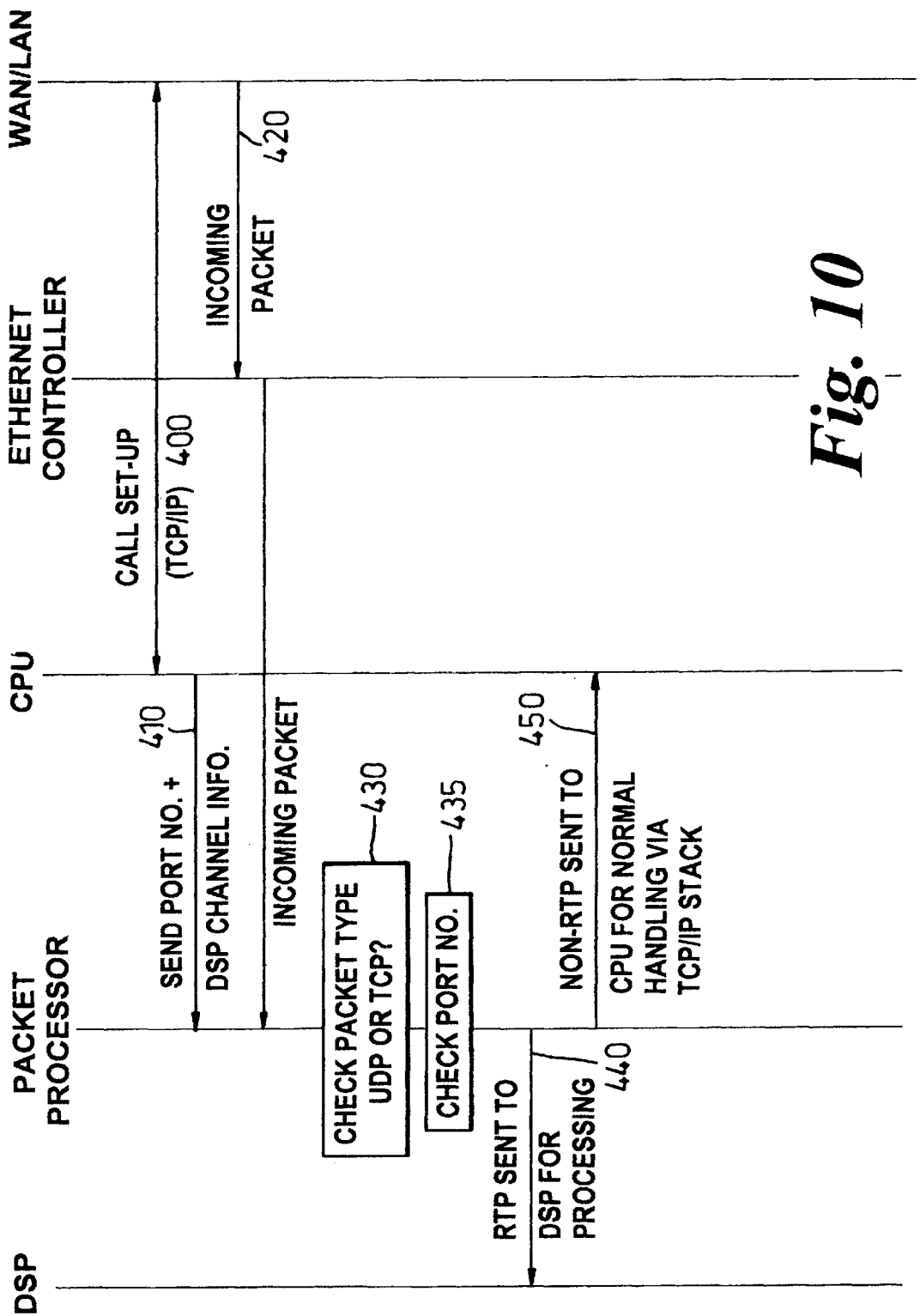
FIG. 10 shows a method in which received data packets can be processed.

FIGS. 8 to 10 show methods and apparatus for processing packets more efficiently.

The traffic carried by an IP gateway can be divided into two kinds:
Real time transport protocol (RTP) packets carrying real time e.g. voice traffic; and
Non-RTP packets carrying e.g. signaling.

For an IP telephony gateway, more than 99% of packets are RTP packets carrying voice traffic. This places an onerous demand on the processor in order to assemble the packets in real time. Providing 32 channels of non-compressed G.711 voice traffic at 10 milliseconds voice payload per packet creates 3200 transmit and 3200 received packets per second. Using the routing software of realtime Operating Systems such as VxWorks™, from Wind River Systems, half of the real-time budget for transmitting a packet is taken up with passing the packet through the UDP/IP/Ethernet stack, even on quite powerful processors, such as the Intel 486DX100. To scale to even higher channel capacities requires a powerful, expensive processor.

However, since most of the packets are RTP packets, significant savings can be made by use of the template packet technique previously described. In addition to simplifying the processing requirements by using a template packet, as previously described, it is also possible to obtain further benefits by using the templating mechanism to offload UDP Stream packet processing from the main CPU to a lower cost co-processor optimized to the job of applying the template to the data stream. This architecture comprises two processors:
a first processor (packet processor 320) which is optimised to handle processing of RTP packets. This processor can be a field programmable gate array (FPGA) or a micro-RISC processor which are often provided as co-processors to Embedded System Controllers, such as the Power QUICC from Motorola™, or other device.
a second processor to handle processing of all other packets, i.e. non-RTP packets, and the template packets and running other application code. This second processor can be a CPU such as an Intel™ 486 or Pentium™ processor.

A reduced instruction set (RISC) processor or FPGA device has a reduced functionality compared with a full CPU, but has a significantly lower cost compared with the full CPU.

This technique will now be described in more detail with reference to FIGS. 8 and 9. FIG. 8 shows the steps involved in processing packets for transmissions. Firstly, in response to a call request by a user, a call is set up (step 200). This would typically be achieved using TCP/IP signaling. If the call is to carry real-time data, such as voice traffic, a UDP/IP packet stream will be generated between this source and a fixed destination, i.e. every packet in the stream will go to the same destination and will therefore carry the same overhead information. The CPU (step 210) routes a template packet through the UDP/IP stack to generate the template which will be used by subsequent packets. This template is sent (step 220) to the packet processor. The packet processor receives the template and prepares to receive the real-time data, setting up (step 240) a DSP channel for processing the data. Real time data is sent (step 245) to the DSP which then processes the data (step 250) before sending the processed data (step 260) to the packet processor. The packet processor applies the template to each batch of processed data to form a UDP/IP packet (step 270) and then sends the packet (step 280) via the Ethernet controller to the data network. UDP/IP packets are sent directly to the network without any processing by the CPU. Preferably, the CPU has no involvement in RTP packet transmission once the template is created, but some SRAM buffer maintenance or gathering of statistics may be done by the CPU. The amount of work to be done by the CPU depends on the ability of the Packet Processor to work autonomously. The CPU has ultimate control of the packet processor, as it handles the signaling and control part of processing the UDP streams.

The method for handling received packets will now be described with reference to FIG. 10. As before, a call is set up between a source entity and this receiving entity (step 400) typically using TCP/IP signaling. The CPU sends a UDP port number and corresponding DSP channel information (step 410) to the packet processor. An incoming IP packet (step 420) is received from the data network by the Ethernet controller which DMAs (direct memory accesses) the packet directly to the static RAM 325 of the packet processor. The packet processor inspects the packet type (step 430) and the port number (step 435) of the received packet. The data from RTP packets is sent to a DSP device for processing e.g. decompressing (step 440). The port number supplied by the CPU can determine the DSP channel that the packet processor uses. If the packet processor determines that the packet type is not UDP, or if the port number is for a non-RTP port, the packet is sent to the CPU for normal handing. Depending on the capabilities of the packet processor, for RTP packets, the packet processor signals to the CPU to release SRAM buffers used by the incoming packet or it may be release them for reuse itself.

The Packet Processor 320 can be as complex or as simple as the application requires. For some implementations an FPGA with some help from the main CPU will suffice, while in others the Packet Processor may be a full blown CPU in it's own right. The differences will be due to the number of packets per second required to be handled by the system and how much extra work the main CPU must perform.

What is claimed is:

1. A method of processing a received data stream which is intended for transmission in packet form over a data network, the method comprising:

forming the received data stream into a stream of packets, each packet comprising a payload section of data and an overhead section;

said stream of packets being formed by creating a template, applying the template to the received data to form the stream of packets and without passing that data through a routing stack;

and wherein said template is formed by:
generating a packet which can subsequently be identified as a template packet;
sending that template packet through a routing stack such that routing information is applied to the template packet;
subsequently identifying that racket as a template packet; and
using the routing information that has been applied to the template packet by the routing stack to form the template.

2. A method according to claim 1 further comprising the step of creating a template structure in memory and wherein the template packet comprises a pointer to the template structure in memory.

3. A method according to claim 2 wherein the template structure includes an identifier that the packet is a template packet.

4. A method according to claim 2 wherein the step of using the routing information to form the template comprising copying the routing information from the template packet to the template structure.

5. A method according to claim 1 wherein the step of subsequently identifying the packet as a template packet is performed at the data link layer.

6. A method according to claim 1 wherein a new template is created periodically during the duration of the data stream.

7. A method according to claim 1 further comprising determining the type of packet and only performing the steps of generating a template and applying the template on selected packet types.

8. A method according to claim 7 wherein the steps of generating and applying the template are performed for at least one of: Realtime Transport Protocol (RTP) and User Datagram Protocol (UDP) packet types.

9. A method according to claim 1 wherein the packets are internet protocol (IP) packets.

10. A method according to claim 1 wherein the step of forming the data into packets forms packets having an equal length payload and wherein a checksum for a packet is calculated once and forms part of the template for applying to the stream of packets.

11. A method according to claim 1 wherein the step of creating the template packet is performed by a first processor and the step of applying the template to the data is performed by a second processor.

12. A method according to claim 11 wherein the second processor is a processor that has lower functionality than the first.

13. A method according to claim 12 wherein the second processor is one of: a co-processor of the first processor; a reduced instruction set (RISC) processor, and a field programmable gate array (FPGA).

14. Apparatus for processing a received data stream which is intended for transmission in packet form over a data network, the apparatus comprising:

a processor arranged to form the received data stream into a stream of packets, each packet comprising a payload section of data and an overhead section;

said stream of packets being formed by creating a template, applying the template to the received data to form the stream of packets and without passing that data through a routing stack;

and wherein said processor is arranged to form said template by:
generating a packet which can subsequently be identified as a template packet;
sending that template packet through a routing stack such that routing information is applied to the template packet;
subsequently identifying that packet as a template packet; and
using the routing information that has been applied to the template packet by the routing stack to form the template.

15. Software code stored on a machine-readable medium for causing a data stream processing apparatus which processes a received data stream for transmission over a data network by receiving a data stream and forming the data into a stream of packets, each packet comprising a payload section of data and an overhead section, to perform the steps of: creating a template and applying the template to the received data to form the stream of packets and without passing that data through a routing stack; and wherein said software code is arranged to cause said data stream processing apparatus to form said template by:
        generating a packet which can subsequently be identified as a template packet;
        sending that template packet through a routing stack such that routing information is applied to the template packet;
        subsequently identifying that packet as a template packet; and
        using the routing information that has been applied to the template packet by the routing stack to form the template.

16. A method of processing data packets, the packets being of two types: signalling packets and real-time packets carrying real-time data, the method comprising the steps of:

processing the signalling packets by a first processor; and,
    processing the real-time data packets by a second processor; and
    wherein for transmitting packets, the method comprises:
        generating, using the first processor, a template for use by the real-time data packets; and,
        applying, using the second processor, the template to the real-time data packets; and
        using said first processor to form the template by:
            generating a packet which can subsequently be identified as a template packet;
            sending that template packet through a routing stack such that routing information is applied to the template packet;
            subsequently identifying that packet as a template packet; and
            using the routing information that has been applied to the template packet by the routing stack to form the template.

17. A method according to claim 16 wherein the second processor is a processor that has lower functionality than the first.

18. A method according to claim 17 wherein the second processor is one of: a co-processor of the first processor; a reduced instruction set (RISC) processor, and a field programmable gate array (FPGA).

19. Apparatus for processing data packets, the packets being of two types: signalling packets and real-time packets carrying real-time data, the apparatus comprising:

a first processor for processing the signalling packets and generating a template;
    a second processor for processing the real-time data packets and applying the template to the real-time data packets; and
    wherein said first processor is arranged to form the template by:
        generating a packet which can subsequently be identified as a template packet;
        sending that template packet through a routing stack such that routing information is applied to the template packet;
        subsequently identifying that packet as a template packet; and
        using the routing information that has been applied to the template packet by the routing stack to form the template.

20. Apparatus according to claim 19 wherein the second processor is a processor that has lower functionality than the first.

21. Apparatus according to claim 20 wherein the second processor is one of: a co-processor of the first processor; a reduced instruction set (RISC) processor, and a field programmable gate array (FPGA).

\* \* \* \* \*